United States Patent Office 2,862,956
Patented Dec. 2, 1958

2,862,956

AROMATIC ETHER AND THIOETHER o-METHYLENE BENZOIC ACIDS AND THEIR SALTS AND ESTERS, AND A PROCESS OF PRODUCING SAME

Wolfgang Gündel, Dusseldorf, Oberkassel, and Heinz Linden, Dusseldorf, Germany, assignors to Henkel & Cie. G. m. b. H., Dusseldorf-Holthausen, Germany, a corporation of Germany No Drawing. Application March 2, 1954
Serial No. 413,704

Claims priority, application Germany March 13, 1953

15 Claims. (Cl. 260—470)

This invention relates to aromatic ether and thioether carboxylic acids and their salts and esters, and more particularly to ethers and thioethers of o-hydroxy methyl benzoic acids and their salts and esters, and to a process of producing same.

It is one object of our invention to provide new ethers and thioethers of o-hydroxy methyl benzoic acids and their salts and esters, said compounds being valuable products useful for many technical purposes.

Another object of our invention is to provide a simple and effective process of producing, with a high yield, ethers and thioethers of o-hydroxy methyl benzoic acids and their salts and esters.

Still another object of our invention is to provide new and valuable plasticizers, gelatinizing, swelling and softening agents for synthetic resins and high polymer compounds.

A further object of the invention is to provide new and valuable additives for lubricants.

A further object of the invention is to provide new and valuable fixatives for perfumes.

Various other objects and advantages of our invention will become apparent as this description proceeds.

We have discovered that compounds of the general formula:

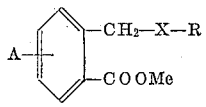

may be produced by reacting o-hydroxy methyl benzoic acids which may be substituted in their benzene ring, or their inner esters in the presence of acid binding agents, with organic hydroxy or mercapto compounds. In the above formula, A indicates one to four hydrogen atoms of the aromatic ring or a corresponding number of the same or different substituents, especially of hetero atoms or groups of hetero atoms in place of said hydrogen atoms, while X is oxygen or sulfur, R an organic residue, and Me a salt forming cation, preferably an alkali metal cation. Preferred substituents A are halogen atoms or nitro groups. R is preferably a residue with 1 to 20 carbon atoms.

Esters of said compounds may also be produced by the process of our invention corresponding to the following general formula:

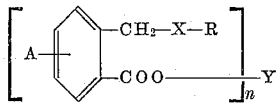

In said formula A, X and R indicate the same atoms, substituents, or residues as stated above, while Y is the residue of an n-valent alcohol with 1 to 20 carbon atoms and $n$ is an integer from 1 to 6 and preferably from 1 to 3. R and Y may be identical.

When using the inner ester of an o-hydroxy methyl benzoic acid, i. e. a phthalide, as starting material for carrying out the process according to our invention, the reaction proceeds, in the absence of water, according to the following equation:

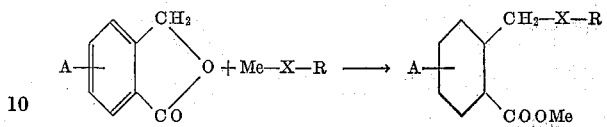

In place of phthalide itself, substituted phthalides, such as, for example, 6-chloro phthalide, 4,7-dichloro phthalide, or 6-nitro phthalide, can be used as starting materials.

Any hydroxy compound or mercapto compound which yields salts or metal compounds, such as alcohols, phenols, mercaptans, may be used as the organic residue R in the above designated reaction and may be reacted according to our invention with said acid reaction component.

As examples of such reactants there may be mentioned, for instance, alcohols, such as ethanol, butanol, n-octanol, n-dodecanol, n-hexadecanol, n-octadecanol, 2-ethyl hexanol-1, 2-methyl heptanol-1, 3,5,5-trimethyl hexanol-1, butoxy ethanol, octyloxy ethanol, phenyl ethanol, phenoxy ethanol, 4-chloro phenoxy ethanol, 2,4-dichloro phenoxy ethanol, 4-chloro-2-tolyloxy ethanol, 2,4,5-trichloro phenoxy ethanol, naphthyl-1-ethanol, naphthyl-1-hydroxy ethanol, tetrahydrofurfuryl alcohol, benzyl alcohol, naphthyl-1-methyl alcohol, chloro ethanol, cyclohexanol, methyl cyclohexanol, glycol, diethylene glycol, 1,4-butanediol, 1,6-hexanediol and others.

Furthermore, metal compounds or salts of aromatic hydroxy compounds, i. e., of phenols, can be used as starting materials, such as, for instance, phenol, 4-cresol, 4-chloro phenol, 2-cresol, 4-chloro-2-cresol, 2,4-dichloro phenol, 2,4,5-trichloro phenol, 3,5-xylenol, 4-isobutyl phenol, 4-isooctyl phenol, 4-chloro-2-benzyl phenol, 2-phenyl phenol, guaiacol, carvacrol, thymol, 4-phenoxy phenol, 1-naphthol, 2-naphthol, 1-chloro-2-naphthol, 4-chloro-1-naphthol, pyrocatechol, 4,4'-dihydroxy diphenyl methane, 4,4'-dihydroxy diphenyl propane, 4,4'-dihydroxy diphenyl sulfone, nitro phenols, and others.

Organic mercapto compounds representing suitable starting materials for the process according to the present invention are, for instance, butyl mercaptan, octyl mercaptan, benzyl mercaptan, thiophenol, 2-thionaphthol, methyl thiouracil, mercapto benzothiazole and others.

The preferred starting materials, as stated above, are hydroxy or mercapto compounds, respectively, with 1 to 20 carbon atoms in their molecule.

By the term "salts and metal compounds" of said organic hydroxy or mercapto compounds, respectively, there are primarily understood the alcoholates or phenolates or thiophenolates of mono-, di-, and trivalent metals, such as potassium, sodium, magnesium, aluminum, and others. Said salts and metal compounds are produced in the customary manner. For instance, the hydroxy or mercapto compounds, respectively, are reacted with metals or their hydroxides. When working with metal hydroxides, the water formed during reaction must, of course, subsequently be removed.

Reaction between phthalides and organic hydroxy or mercapto compounds, respectively, is effected by causing approximately equivalent amounts of both reaction components to react with each other in the absence of, or in the presence of, a water-free solvent, preferably at elevated temperature. The solvents used may be of indifferent nature, such as xylene, chloro benzene, dekahydro-naphthalene, and the like. When reacting phenolates or thiophenolates, respectively, alcohols and especially higher boiling alcohols which allow working without pressure even at higher temperature, may serve as very suitable and effective solvents. The hydroxy or mercapto compounds themselves, respectively, as they are used in this reaction may also be employed as solvents. In this case they are added in excess. This modification of the process is advisable, should the hydroxy or mercapto compounds, respectively, readily be distilled off or otherwise readily be removed from the reaction mixture. Suitable reaction components of this type are, for instance, butanol, phenol, and the like.

It is, of course, also possible to start with o-hydroxy methyl benzoic acid or its substitution products. In this case the reaction proceeds according to the following equation:

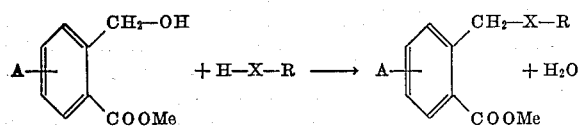

In these formulas A, X, R and Me correspond to the above given definition.

The most important reaction components in this modification of the process according to the present invention are salts of o-hydroxy methyl benzoic acid. Said salts are obtainable in a simple manner by dissolving the readily available phthalide in aqueous alkaline medium and, if necessary, evaporating the resulting solution to dryness. It is, however, also possible, to start with salts of o-hydroxy methyl benzoic acids which are substituted in the benzene nucleus and which can be produced in an analogous manner from derivatives of phthalide that are substituted in the benzene nucleus such as, for instance, from 6-chloro phthalide, 4,7-dichloro phthalide, 6-nitro phthalide, and others. As salt-forming bases there may be used in this case all those bases the aqueous solutions of which are capable of splitting up the lactone ring of said phthalides. Preferably the hydroxides of mono-, di-, or trivalent metals, respectively, such as, for instance, the hydroxides of alkali, alkaline earth, and earth metals are used.

The same hydroxy or mercapto compounds, respectively, are employed as reaction components as they are used for etherification of phthalide and its derivatives and are mentioned above.

Reaction takes place by causing approximately equivalent amounts of both reactants to react with each other in the absence or presence of a solvent at a temperature between 50° C. and 250° C. and preferably between 100° C. and 200° C. Thereby care must be taken that the water split off during reaction is removed from the reaction mixture. Indifferent solvents, such as toluene, xylene, chloro benzene, decahydronaphthalene and others can be added and used as solvents. Said solvents cause, at the same time, removal of the water formed during reaction by carrying along said water on distillation in the form of a binary mixture. It is, of course, also possible to use an excess of the hydroxy or mercapto compound, respectively, to be reacted, which excess serves as solvent and to carry along therewith and remove the water formed. This modification of the process is advisable in case the excess of hydroxy or mercapto compound, respectively, is readily removable by distillation. To carry out the reaction, it is necessary first to isolate the salts of 2-hydroxy methyl benzoic acid as such. Preferably and in a very simple manner said isolation of the salt is effected by dissolving the phthalide in the equivalent amount of not-too-dilute metal hydroxide solution, whereupon the hydroxy or mercapto compound, respectively, and, if desired, the agent capable of carrying along and removing water from the reaction mixture are added. The water introduced into said recation mixture by aqueous metal hydroxide solution is removed by heating to about 100° C. whereupon, without interruption, the reaction mixture is heated to higher reaction temperatures, thereby removing the water formed by the reaction proper. When using simple phenols which do not unfavorably affect the reaction in the absence of steric changes and transformations, it is possible to achieve yields exceeding 90% of the theoretical yield.

It is very surprising that in certain specific cases the reaction according to the process of this invention can even be carried out in the presence of water as solvent. It is, for instance, possible to produce the sodium salt of 2-phenoxy methyl benzoic acid by heating a 25% aqueous solution of equivalent amounts of the sodium salt of 2-hydroxy methyl benzoic acid and phenol in an autoclave at 130° C. for 28 hours, although the yield is somewhat lower than when working in the absence of water.

To produce the esters of said ethers or thioethers, respectively, of o-hydroxy methyl benzoic acids, the free ether or thioether methyl benzoic acids, respectively, are used as starting materials and are reacted with the corresponding hydroxy compounds under conditions whereby esterification takes place, i. e., in the absence or presence of esterification catalysts at elevated temperature. One may, of course, also use salts of said ether or thioether methyl benzoic acids, respectively, as starting materails, which salts are reacted at elevated temperature and, if required, in the presence of a solvent with hydrogen halide esters of those hydroxy compounds, the esters of which are to be produced. This mode of operation is of particular advantage in all those cases where the production of esters of those hydroxy compounds which are technically obtained from the corresponding halogenides, such as, for instance, benzyl alcohol and others, is involved. When working in this manner, the step of saponifying said halogenides to the corresponding hydroxy compounds is omitted. According to another embodiment of this esterification step, the acids are first converted into the corresponding acid halogenides and said halogenides are then reacted with esterifying hydroxy compounds in the presence of acid binding agents.

As alcoholic esterification components, there are involved all esterifiable aliphatic, cycloaliphatic, aromatic, aliphatic-aromatic, cycloaliphatic-aromatic, or heterocyclic hydroxy compounds, or their hydrogen halide esters, or mixtures thereof. Said hydroxy compounds or their hydrogen halide esters may also be of polyvalent character or may be substituted, if desired, by other suitable substituents. Said group of compounds includes those hydroxy compounds which are present in the form of the residue R in ether or thioether carboxylic acid compounds to be produced according to the present invention. Furthermore, said group of compounds comprises polyvalent alcohols, such as ethylene glycol, glycerol, pentaerythritol, dipentaerythritol, and others.

The esters of the aromatic ether and thioether carboxylic acids obtained according to the present invention are valuable plasticizing, gelatinizing, swelling and softening agents useful in the production of plastic compositions made of vinyl polymers, polyesters, polyamides, cellulose esters and ethers, chlorinated rubber, and other highly polymerized compounds. Said esters are also used as additives to lubricants, as fixatives for perfumes, and for other technical purposes.

The following examples serve to illustrate the present invention without, however, limiting the same thereto:

EXAMPLE 1

2-phenoxy methyl benzoic acid 2.3 g. of metallic sodium (0.1 mol) are added to a solution of 9.4 g. of phenol (0.1 mol) in 100 g. of butanol. After the sodium has been completely dissolved, 13.4 g. of phthalide (0.1 mol) are added to said phenolate solution. The mixture is boiled under reflux for 16 hours, butanol is distilled off, the residue is dissolved in water and the carboxylic acid formed is precipitated by the addition of 50 cc. of 2 N hydrochloric acid. After heating for a short period of time, the mixture is cooled and the oil which solidifies to a crystalline mass in the cold, is separated. Said crystalline mass is triturated in a mortar with old 5% sodium carbonate solution. Unreacted phthalide, if present, is substantially insoluble in said sodium carbonate. (When using higher phenol homologues, in place of phenol, as described in the following examples, said higher phenols are also removed by trituration with sodium carbonate solution, since the unreacted higher phenol homologues are substantially insoluble therein.) The sodium carbonate solution is filtered, preferably with the addition of decolorizing carbon. Crude 2-phenoxy methyl benzoic acid is precipitated from the filtrate by adding drop by drop dilute hydrochloric acid in the cold thereto. The precipitate is dried and dissolved in ether to remove small amounts of acid by-products of high melting point which are insoluble therein. Said undissolved impurities are filtered off, the ether is evaporated from the filtrate, and 9 g. to 10 g. of pure 2-phenoxy methyl benzoic acid are obtained as evaporation residue. Said acid, on recrystallization from benzene, has a melting point of 126.5° C.

Using, in place of butanol, the same amount of cyclohexanol as solvent and carrying out the above described condensation by heating for 6 hours at 200° C., yields, on working up the reaction mixture in an analogous manner as described above, 11 g. to 12 g. of pure 2-phenoxy methyl benzoic acid.

EXAMPLE 2

2-(2'-methyl phenoxy methyl) benzoic acid

Working according to the particulars given in Example 1, but reacting, in place of 9.4 g. of phenol, 10.8 g. of o-cresol (0.1 mol) yields, on working up the reaction mixture in an analogous manner, pure 2-(2'-methyl phenoxy methyl) benzoic acid melting, on recrystallization from benzene or xylene, at 152° C. The yield is slightly lower than the yield of the corresponding lower homologue of Example 1.

EXAMPLE 3

2-phenyl thiomethyl benzoic acid 2.3 g. of sodium metal (0.1 mol) are added to a solution of 11.0 g. of thiophenol (0.1 mol) in 100 cc. of butanol. To the resulting solution there are added 13.4 g. of phthalide. The reaction mixture is heated, while stirring, at 100° C. for 8 hours. Butanol is distilled off. The crystalline residue is dissolved in water and filtered with the addition of animal charcoal. 2-phenyl thiomethyl benzoic acid is precipitated by the addition of 50 cc. of 2 N hydrochloric acid and the precipitate is recrystallized from benzene or dilute alcohol. 21.8 g. of pure acid which, after recrystallization from benzene, has a melting point of 112° C., are obtained.

EXAMPLE 4

2-butoxy methyl benzoic acid 13.4 g. of phthalide are added to a solution of 2.3 g. (0.1 mol) of metallic sodium in 100 cc. of butanol. The reaction mixture is heated under reflux for 16 hours. Butanol is distilled off and the remaining residue is dissolved in 100 cc. of water. Decolorizing carbon is added to said aqueous solution. After filtration, 50 cc. of N hydrochloric acid are added to the filtrate. The precipitating oil solidifies in the cold to a crystalline mass and is dissolved, as described in Example 1, in 5% sodium carbonate solution. If necessary, undissolved by-products are removed by filtration and crude 2-butoxy methyl benzoic acid is precipitated from the filtrate by the addition of hydrochloric acid in the cold. Small amounts (about 0.5 g.) of high melting by-products present in the crude acid are removed by dissolving said crude acid in ether wherein said by-products are insoluble. The ether is removed by evaporation from the ethereal solution and the residue is recrystallized from 20% acetic acid thereby yielding 2-butoxy methyl benzoic acid of analytical grade purity and having a melting point of 63° C. to 64° C.

EXAMPLE 5

2-(n-octyloxy methyl) benzoic acid

When proceeding according to the particulars given in the preceding example, but using, in place of butanol, 100 g. of n-octanol, 2-(n-octyloxy methyl) benzoic acid is obtained which is purified to analytical-grade purity by recrystallization from 60% acetic acid. Melting point: 66° C. to 67° C.

EXAMPLE 6

2-phenoxy methyl benzoic acid

A mixture of 17.4 g. of the sodium salt of 2-hydroxy methyl benzoic acid (0.1 mol), 9.4 g. of phenol (0.1 mol), and 50 cc. of xylene is heated to boiling, while stirring, in an esterifying apparatus with automatic water separator as described, for instance, in "Organic Syntheses" Collective Volume I (1951), on page 262 or on page 422, until no further increase of the amount of water collected in the automatic separator is observed. Usually this requires about 6 to 8 hours. Xylene and small amounts of unreacted phenol are removed by steam distillation. The remaining aqueous solution, if necessary, is decolorized by means of decolorizing carbon, and 50 cc. of 2 N hydrochloric acid are added to the decolorized filtrate.

To free the crystalline precipitate from traces of unreacted 2-hydroxy methyl benzoic acid, the acid solution, before filtration, is heated for a short period of time, thereby causing conversion of said 2-hydroxy methyl benzoic acid into the corresponding phthalide which is insoluble in sodium carbonate solution. Said phthalide is subsequently removed from the reaction product by a treatment with 50 cc. of 2 N sodium carbonate solution. The acid precipitated in crystalline form on acidifying the resulting sodium carbonate solution still contains small amounts of a high-melting by-product and is freed therefrom by a treatment with ether wherein said by-product is insoluble. On evaporating the ether from the ethereal solution, 11.5 g. of 2-phenoxy methyl benzoic acid are obtained. This acid is purified by recrystallization from benzene, chloroform, or dilute alcohol and melts at 126.5° C.

EXAMPLE 7

2-(2'-methyl phenoxy methyl) benzoic acid

Proceeding according to the particulars give in the preceding example, but using, in place of phenol, 10.8 g. of o-cresol (0.1 mol) yields 14.5 g. of 2-(2'-methyl phenoxy methyl) benzoic acid. On recrystallization from chloroform or benzene, the pure acid is obtained in the form of colorless needles melting at 153° C.

EXAMPLE 8

2-(4'-methyl phenoxy methyl) benzoic acid

Using p-cresol in place of o-cresol and proceeding according to Example 7, yields 2-(4'-methyl phenoxy methyl) benzoic acid in the form of white needles which, on recrystallization from dilute ethanol, melt at 124° C.

EXAMPLE 9

2-(2'-methyl-4'-chloro phenoxy methyl) benzoic acid 17.4 g. of the sodium salt of 2-hydroxy methyl benzoic acid (0.1 mol) and 14.2 g. of 4-chloro-2-cresol (0.1 mol) in 100 cc. of xylene are heated to boiling, while stirring, for 20 hours as described in the preceding examples until 1.5 cc. of water are split off. Subsequently the soluble reaction products of said reaction mixture are extracted with water. On acidifying the aqueous extract, 19 g. of crude 2-(2'-methyl-4'-chloro phenoxy methyl) benzoic acid are precipitated. Said crude acid is freed from phthalide and ether-insoluble impurities by a treatment with sodium carbonate solution and subsequently with ether in the same manner as described in Example 1. Pure 2-(2'-methyl-4'-chloro phenoxy methyl) benzoic acid, on recrystallization from benzene or dilute ethanol, melts at 180° C.

EXAMPLE 10

2-(2',4'-dichloro phenoxy methyl) benzoic acid

Replacing in the preceeding example 4-chloro-2-cresol employed as the one reaction component by 16.3 g. of 2,4-dichloro phenol (0.1 mol) yields, on working up the reaction mixture in an analogous manner as described above, 2-(2',4'-dichloro phenoxy methyl) benzoic acid in about the same yield. Said acid is purified by recrystallization from a mixture of equal parts of benzene and benzine and, in the pure state, has a melting point of about 167° C.

EXAMPLE 11

2-(naphthyl-1'-hydroxy methyl) benzoic acid

Equimolecular amounts of 1-naphthol and the sodium salt of 2-hydroxy methyl benzoic acid in the presence of xylene as diluting agent and as agent for carrying along and removing the water split off during reaction are heated in the same manner as described in the preceding examples until no more water is split off. On working up the reaction mixture by the same procedure as used in said preceding examples, 2-(naphthyl-1-hydroxy methyl) benzoic acid is obtained. Said acid, on recrystallization from benzene, melts at 156° C. to 157° C.

EXAMPLE 12

2-(2'-mercapto benzothiazole-S-methyl) benzoic acid 16.7 g. of 2-mercapto benzothiazole (0.1 mol) and 17.4 g. of the sodium salt of 2-hydroxy methyl benzoic acid are heated in 50 cc. of xylene for 8 hours until no more water is split off. After cooling the resulting sodium salt of 2-(2'-mercapto benzothiazole-S-methyl) benzoic acid is extracted from the reaction mixture by shaking with water. The acid is precipitated from the resulting aqueous extract by acidifying and is purified as described in the preceding examples by a treatment with a 10% sodium carbonate solution. 22 g. of said acid which, after recrystallization from benzene, melts at 168° C. to 169° C., are obtained.

EXAMPLE 13

2-(4'-i-heptyl phenoxy methyl) benzoic acid 4-i-heptyl phenol (melting point: 38° C.) and an equivalent amount of the sodium salt of 2-hydroxy methyl benzoic acid are used as starting materials and are reacted in the same manner as described in the preceding examples. Thereby 2-(4'-i-heptyl phenoxy methyl) benzoic acid is obtained. Said acid, on recrystallization from 70% acetic acid, has a melting point of 104° C. to 105° C.

EXAMPLE 14

S-2-carboxy benzyl thioglycolic acid 17.4 g. of the sodium salt of 2-hydroxy methyl benzoic acid (0.1 mol), 9.6 g. of 95% thioglycolic acid (0.1 mol), 50 cc. of 2 N sodium hydroxide solution, and 100 cc. of xylene are heated in an oil bath to 160° C. to 170° C., while stirring vigorously, until all the water split off during said reaction is removed by azeotropic distillation and the salts suspended in said xylene are solidified to a hard mass. About 2 to 3 hours are required therefor. Xylene is removed by distillation and the residue is dissolved in about 150 cc. of water. The crystalline precipitate obtained on addition of hydrochloric acid is brought into solution by boiling for a short period of time. The crude acid crystallizes on cooling. It is freed from small amounts of phthalide still present in said crude acid, by dissolving in dilute sodium carbonate solution and filtering off the undissolved phthalide. Acidification of the sodium carbonate solution yields 9.4 g. of S-2-carboxy benzyl thioglycolic acid. The pure acid, after repeated recrystallization from water, acetic acid, and butyl acetate, melts at 146° C.

EXAMPLE 15

2-(4'-tertiary butyl phenoxy methyl) benzoic acid

A mixture of the potassium salt of 19 g. of 2-hydroxy methyl benzoic acid (0.1 mol), 15 g. of 4-tertiary butyl phenol of the melting point: 94° C. (0.1 mol), and 100 cc. of xylene are heated to boiling under reflux in an esterification apparatus with automatic water separator as used in Example 6, until no further increase in the amount of water split off during said reaction is observed. About 20 hours are required to complete splitting off of water. 16.5 g. of 2-(4'-tertiary butyl phenoxy methyl) benzoic acid are isolated from the reaction mixture in the same manner as described in Examples 6 and 9. Said acid is recrystallized from benzine (boiling range: 100° C. to 140° C.) and 70% acetic acid and, in the pure state, has a melting point of about 140° C.

EXAMPLE 16

2,2'-bis-2-phenoxy methyl benzoic acid 18.6 g. of 2,2'-diphenol (0.1 mol) and 38 g. of the potassium salt of 2-hydroxy methyl benzoic acid (0.2 mol) are caused to react by heating under reflux for 20 hours in the presence of 100 cc. of xylene which serves as diluting agent and for carrying along and removing the water split off during reaction. After cooling, 100 cc. of water are added to the reaction mixture. The xylene layer is separated and hydrochloric acid is added to the aqueous solution. Thereby acid reaction products precipitate in oily form. Said oily precipitate is dissolved in dilute sodium carbonate solution and the non-reacted 2,2'-diphenol present in said solution is removed by thorough extraction with ether. About 15.5 g. of said diphenol are recovered from the resulting ethereal solution by evaporating the ether. The sodium carbonate solution is freed from residual ether by gently heating and the ether-free solution is acidified. A colorless, crystalline precipitate is obtained thereby which is filtered off. The yield is 26 g. Said acid is purified by repeated recrystallization from large quantities of glacial acetic acid and 70% dimethyl formamide. The pure acid melts at about 250° C. and its analysis indicates that the compound corresponds to the formula $C_{28}H_{22}O_6$. It follows that this product is to be designated as 2',2''-bis-2-phenoxy methyl benzoic acid.

EXAMPLE 17

2-xylenoxy methyl benzoic acid 134 g. of phthalide (1 mol) are dissolved, while heating, in 100 g. of 40% sodium hydroxide solution, whereby an esterification apparatus with automatic water separator as mentioned in Example 6 is used. 183 g. (1.5 mols) of a technical grade xylenol mixture having a hydroxyl number of 461 and 40 cc. of xylene are added to said solution. The xylene serves as agent for carrying along and facilitating removal of the water split off during said reaction. The clear mixture is first heated, while stirring continuously, to a temperature between about 100° C. and about 120° C. until the water introduced into said mixture by the addition of aqueous sodium hydroxide solution is removed therefrom. Subsequently, the temperature is increased to 180° C. to 190° C. After reacting the mixture at said temperature for about 4 hours, reaction is completed and 18 cc. of water corresponding to the theoretical amount are split off. The reaction mixture is cooled to 70° C. and 500 cc. of 2 N hydrochloric acid are slowly added thereto. After thoroughly mixing the hydrochloric acid with the reaction mixture the aqueous sodium chloride layer is removed. The remaining oil is freed from xylene and excess xylenol by distillation in a vacuum. The residue, consisting of a mixture of isomers of crude 2-xylenoxy methyl benzoic acid in the amount of 242 g., is purified by distillation in a high vacuum. 215 g. of a light yellow oil which is viscous in the cold and solidifies in crystalline form on standing for a longer period of time, are obtained thereby. Its boiling point is 233° C. to 247° C./3 mm. kg.

EXAMPLE 18

*2-(2'-cresoxy methyl)-benzoic acid-(2-ethyl hexyl) ester*

A mixture of 242 g. of 2-(2'-cresoxy methyl) benzoic (1 mol), obtained according to Examples 2 or 7, 195 g. of 2-ethyl hexanol (1.5 mols), and 40 g. of xylene are heated in an esterification apparatus with automatic water separator as used in Example 6, to a temperature of 180° C. to 195° C. until no more water is split off and the acid number is below 3. The resulting esterification product is freed from any residual unreacted acid by treatment with a 2% sodium hydroxide solution and is purified by distillation. 317 g. of pure 2-(2'-cresoxy methyl) benzoic acid-(2-ethyl hexyl) ester are obtained. Said ester is a pale yellow liquid of the boiling point 221° C. to 224° C./1 mm. Hg and the saponification number 160 (calculated saponification number: 158).

EXAMPLE 19

*2-xylenoxy methyl benzoic acid n-octyl ester*

256 g. of 2-xylenoxy methyl benzoic acid (1 mol) produced from a technical grade xylenol mixture and phthalide according to the particulars given in Example 17, are esterified with 195 g. of n-octanol (1.5 mols) in the same manner as described in the preceding example. 334 g. of pure 2-xylenoxy methyl benzoic acid n-octyl ester are obtained. Said ester is a yellowish liquid of the boiling point 233° C. to 248° C./1 mm. Hg and the saponification number 154 (calculated saponification number 152).

EXAMPLE 20

*2-xylenoxy methyl benzoic acid butoxy ethyl ester*

134 g. of phthalide (1 mol) are dissolved in 100 g. of 40% sodium hydroxide solution while heating gently. 183 g. of a technical grade mixture of xylenols, said mixture having the hydroxyl number 461 (1.5 mols), and 40 cc. of xylene are added to said solution. Xylene serves as agent for carrying along and removing the water split off on subsequent reaction, from the reaction mixture. After attaching an esterification equipment as used in Example 6 to the reaction vessel, the mixture is heated while stirring continuously, to a temperature of 100° C. to 120° C. in order to remove by azeotropic distillation the water introduced into said mixture with the aqueous sodium hydroxide solution. Subsequently, the temperature is increased to 180° C. to 210° C. After heating for 4 hours, 18 g. of reaction water corresponding to the theoretical amount, are split off and removed and the reaction is completed. The reaction mixture is cooled to 70° C. 500 cc. of 2 N hydrochloric acid are added thereto and thoroughly mixed therewith. The resulting aqueous sodium chloride layer is separated and removed.

236 g. of butoxy ethanol are added to the remaining reaction product and the mixture is esterified by heating to 180° C., while stirring, until no more water is collected in the automatic separator and the acid number has dropped to below 4. Xylene, the excess of xylenol and butoxy ethanol, and a small amount of phthalide are removed by fractional distillation in a vacuum and 2-xylenoxy methyl benzoic acid butoxy ethyl ester formed during the above described esterification is then distilled in a high vacuum. The ester boils at 1 mm. Hg between 224° C. and 244° C. Small amounts of acid compounds are removed from said ester by extraction with dilute sodium hydroxide solution. 292 g. of pure ester having a saponification number of 161 (calculated saponification number: 157) are obtained.

EXAMPLE 21

*2-(4'-cresoxy methyl) benzoic acid benzyl ester*

According to the particulars given in the preceding example, there are reacted 134 g. of phthalide (1 mol), dissolved in 100 g. of 40% sodium hydroxide solution, with 108 g. of p-cresol (1 mol) in the presence of 50 cc. of xylene whereby the reaction temperature is finally increased to 210° C. Heating is continued until all the water introduced into the reaction mixture by the addition of aqueous sodium hydroxide solution and split off during the reaction is removed. 140.5 g. of benzylchloride (1 mol) are then added at about 180° C. to the reaction mixture and heating to 210° C. is continued for 4 hours. The reaction mixture becomes more and more viscous and thickens due to precipitating sodium chloride. After the reaction is complete, said precipitated sodium chloride, together with small amounts of non-reacted phthalide and p-cresol, is removed by thorough washing with dilute sodium hydroxide solution and water. The resulting 2-(4'-cresoxy methyl) benzoic acid benzyl ester is isolated and purified by distillation in a vacuum. The purified ester is a pale yellow liquid which solidifies in crystalline form in the cold and has a boiling point of 248° C. to 253° C./1 mm. Hg and a saponification number of 170 (calculated saponification number: 168). 250 g. of said ester melting after recrystallization from alcohol at 42° C. are obtained.

EXAMPLE 22

*2-phenyl thiomethyl benzoic acid octyl ester*

244 g. of 2-phenyl thiomethyl benzoic acid of the melting point 112° C. (1 mol) obtained, for instance, according to Example 3, are esterfied with 390 g. of n-octanol in the presence of a small amount of xylene at 180° C. as described in the preceding examples. After removing the excess of n-octanol and unreacted acid, there is obtained 2-phenyl thiomethyl benzoic acid n-octyl ester as a yellowish liquid having a saponification number of 160 (calculated saponification number: 157). Said ester cannot be distilled and does not solidify in the cold.

EXAMPLE 23

*2-phenoxy methyl benzoic acid phenyl ester*

A mixture of 9.4 g. of phenol (0.1 mol), 50 cc. of acetone, and 10 g. of 40% sodium hydroxide solution is added to 24.6 g. of 2-phenoxy methyl benzoylchloride (0.1 mol) obtained by the action of phosphorous pentachloride upon free 2-phenoxy methyl benzoic acid prepared, for instance, according to Example 1. The mixture is heated to boiling for several hours. The resulting 2-phenoxy methyl benzoic acid phenyl ester can be saponified only with difficulty and melts, after recrystallization from a small volume of petroleum ether, at 69° C.

The term "ether" as used herein and in the claims annexed hereto includes also thioethers.

The term "etherifiable compounds" comprises alcohols, phenols, mercaptans and thiophenols.

The term "ester saponifying base" includes all basic compounds capable of saponifying esters and especially alkali hydroxides.

The term "esterifying compound" refers to alcohols, phenols (mercaptans, thiophenols), halogenated aliphatic, aliphatic-aromatic, cycloaliphatic, cycloaliphatic-aromatic compounds, i. e. all those halogen compounds which have a reactive halogen atom.

While we have given several examples of the practice of our invention, it will be understood that the principle of our invention may be practiced in many other ways than the specific examples given, and that the scope of our invention is defined by the following claims.

We claim:

1. In a process of producing 2-hydroxy methyl benzoic acid compounds of the formula:

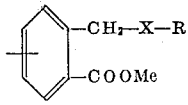

wherein X is a member selected from the group consisting of oxygen and sulfur, R is an aromatic hydrocarbon radical, and Me is a member of the group consisting of hydrogen and a salt forming cation, the step comprising reacting a compound selected from the group consisting of o-hydroxyl methyl benzoic acid, an o-hydroxy methyl benzoate and an inner ester of o-hydroxy methyl benzoic acid in the presence of a compound selected from the group consisting of mono-, di- and tri-valent metal hydroxides with an organic compound selected from the group consisting of aromatic hydrocarbon alcohols and aromatic mercaptans at a temperature of at least 100° C.

2. In a process of producing 2-hydroxyl methyl benzoic acid compounds of the formula:

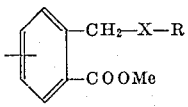

wherein X is a member selected from the group consisting of oxygen and sulfur, R is an aromatic hydrocarbon radical, and Me is a member of the group consisting of hydrogen and a salt forming cation, the step comprising reacting a compound selected from the group consisting of o-hydroxy methyl benzoic acid, an o-hydroxy methyl benzoate and an inner ester of o-hydroxy methyl benzoic acid in the presence of a compound selected from the group consisting of mono-, di- and tri-valent metal hydroxides with an organic compound selected from the group consisting of aromatic hydrocarbon alcohols and aromatic mercaptans at a temperature of at least 100° C., and esterifying the resulting acid with a compound selected from the group consisting of aromatic hydrocarbon alcohols.

3. In a process of producing ethers of o-hydroxy methyl benzoic acid, compounds, the step comprising heating a compound selected from the group consisting of o-hydroxy methyl benzoic acid, its inner ester and an o-hydroxy methyl benzoate with an etherifiable compound selected from the group consisting of aromatic hydrocarbon alcohols and aromatic mercaptans, to a temperature of at least 100° C. in the presence of a compound selected from the group consisting of mono-, di- and tri-valent metal hydroxides until the hydroxyl group of said o-hydroxy methyl benzoic acid is etherified.

4. In a process of producing ethers of o-hydroxy methyl benzoic acids, the step comprising heating phthalide with an alkali metal phenolate in the presence of a water-free inert organic solvent until the metal salt of a phenol ether of the o-hydroxy methyl benzoic acid corresponding to the phthalide used as starting material is formed.

5. In a process of producing ethers of o-hydroxy methyl benzoic acids, the step comprising heating phthalide with an alkali metal thiophenolate in the presence of a water-free inert organic solvent and at a temperature of at least 100° C. until the alkali metal salt of a thiophenol ether of the o-hydroxy methyl benzoic acid corresponding to the phthalide used as starting material is formed.

6. In a process of producing ethers of o-hydroxy methyl benzoic acids, the step comprising heating an alkali metal salt of an o-hydroxy methyl benzoic acid with phenol at a temperature of at least 100° C. in the presence of an inert organic solvent forming with water an azeotropic mixture, until splitting off of water ceases and removing the water split off during said etherification from the reaction mixture.

7. In a process of producing ethers of o-hydroxy methyl benzoic acids, the step comprising heating an alkali metal salt of an o-hydroxy methyl benzoic acid with thiophenol at a temperature of at least 100° C. in the presence of an inert organic solvent forming with water an azeotropic mixture, until splitting off of water ceases and removing the water split off during said etherification from the reaction mixture.

8. In a process of producing ethers of o-hydroxy methyl benzoic acids, the steps comprising dissolving phthalide in an aqueous solution of about the equivalent amount of an ester-saponifying base, adding to said solution an organic etherifiable compound selected from the group consisting of aromatic hydrocarbon alcohols and aromatic mercaptans, and an inert organic solvent forming with water an azeotropic mixture, heating said mixture to a temperature of at least 100° C. to cause saponification of the phthalide, continuing such heating until the water introduced into the reaction mixture with said aqueous solution of an ester-saponifying base is completely removed, increasing the temperature of said reaction mixture to at least 100° C. until the water split off on etherification is completely removed, and precipitating the resulting etherified o-hydroxy methyl benzoic acid from the reaction mixture by the addition of a mineral acid.

9. In a process of producing esters of etherified o-hydroxy methyl benzoic acids, the step comprising heating an ether of an o-hydroxy methyl benzoic acid and an esterifying aromatic hydrocarbon hydroxy compound to a temperature of at least 100° C. in the presence of an inert organic solvent forming with water an azeotropic mixture and continuing such heating until the water split off during esterification is completely removed and esterification is completed.

10. In a process of producing esters of etherified o-hydroxy methyl benzoic acids, the step comprising heating an alkali metal salt of an ether of an o-hydroxy methyl benzoic acid with a hydrogen halide ester of an esterifying aromatic hydrocarbon hydroxy compound to a temperature of at least 100° C. until esterification is completed.

11. In a process of producing esters of etherified o-hydroxy methyl benzoic acid compounds, the step comprising heating an acid halogenide of an etherified o-hydroxy methyl benzoic acid with an esterifying aromatic hydrocarbon hydroxy compound to a temperature of at least 100° C. in the presence of a compound selected from the group consisting of mono-, di- and tri-valent metal hydroxides until esterification is completed.

12. An ester of an etherified o-hydroxy methyl benzoic acid of the following formula:

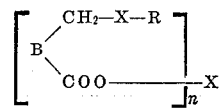

wherein B indicates a benzene radical, X is a member selected from the group consisting of oxygen and sulfur, R is the organic radical of an etherifiable organic compound, n is an integer from 1 to 6, and Y is the radical of an n-valent aromatic hydrocarbon hydroxy compound.

13. The product of claim 12 wherein Y is a phenyl radical.

14. The 2-phenoxy methyl benzoic acid phenyl ester.

15. The 2-(4'-cresoxy methyl) benzoic acid benzyl ester.

References Cited in the file of this patent

UNITED STATES PATENTS

| | | |
|---|---|---|
| 2,132,864 | Bindler | Mar. 2, 1943 |
| 2,383,074 | Parker et al. | Aug. 21, 1945 |
| 2,449,991 | Gresham et al. | Sept. 28, 1948 |

OTHER REFERENCES

Beilstein's Handbuch, 10, 219 (1927); 1st. Suppl. 95, (1932); 2nd Supp. 129 (1949).

Hickinbottom: "Reactions of Organic Chemistry," p. 232, Longmans, 1948.

Hickinbottom: "Reactions of Organic Compounds," p. 98, Longmans, 1948.

UNITED STATES PATENT OFFICE
CERTIFICATE OF CORRECTION

December 2, 1958

Patent No. 2,862,956

Wolfgang Gündel et al.

It is hereby certified that error appears in the printed specification of the above numbered patent requiring correction and that the said Letters Patent should read as corrected below.

Column 3, line 71, for "recation" read -- reaction --; column 9, line 26, after "benzoic" insert -- acid --; column 11, line 30, for "o-hydroxyl" read -- o-hydroxy --; line 37, for "2-hydroxyl" read -- 2-hydroxy --; column 12, line 74, lower right-hand portion of the formula, for "X" read -- Y --.

Signed and sealed this 7th day of April 1959.

(SEAL)
Attest:

KARL H. AXLINE
Attesting Officer

ROBERT C. WATSON
Commissioner of Patents